April 9, 1940.  T. H. STONE  2,196,946
ALIGHTING GEAR FOR AIRCRAFT
Filed Aug. 8, 1939   2 Sheets-Sheet 2
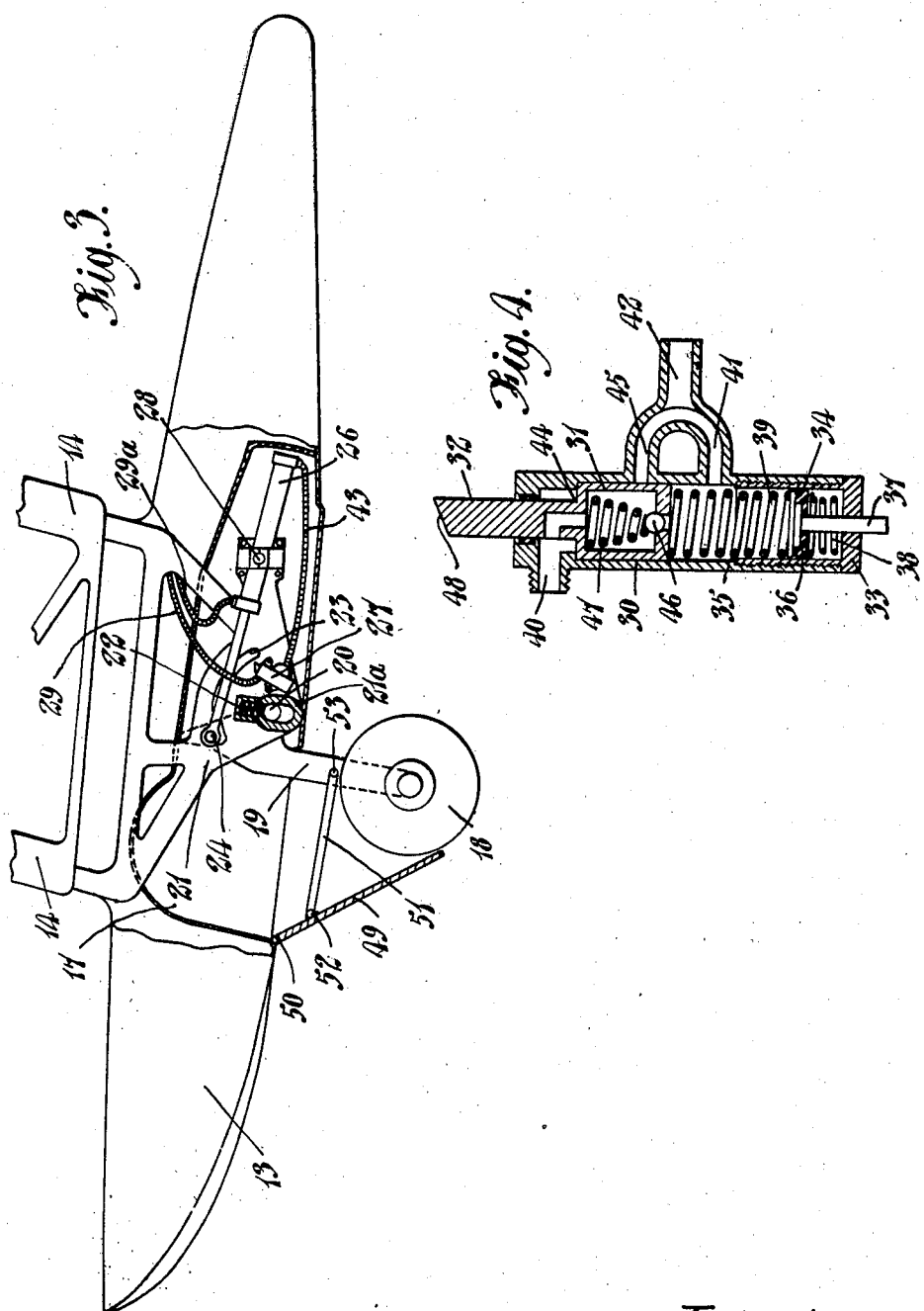

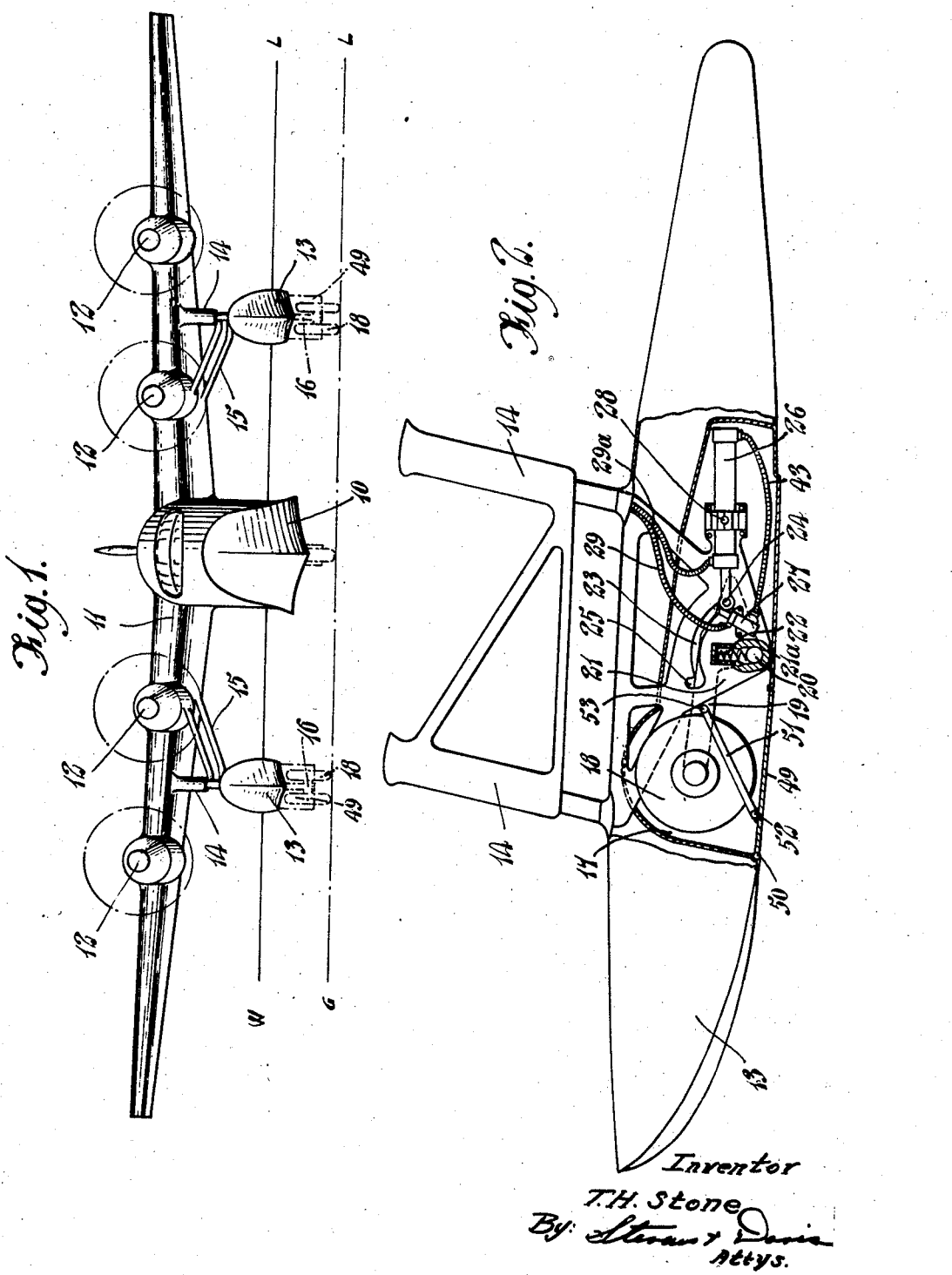

Patented Apr. 9, 1940

2,196,946

UNITED STATES PATENT OFFICE 2,196,946

ALIGHTING GEAR FOR AIRCRAFT

Theodore Handley Stone, Singapore, Straits Settlements

Application August 8, 1939, Serial No. 289,084
In Great Britain August 2, 1938

5 Claims. (Cl. 244—101)

This invention relates to alighting gear for aircraft and is particularly concerned with aircraft of the flying boat kind, i. e., one having a buoyant hull or fuselage. The invention seeks to provide landing gear so that the aircraft may be used as an amphibian, being capable of landing on and taking-off from both land and water aerodromes.

Aircraft of the flying boat kind are known in which wheel undercarriages are provided, enabling them to operate from land aerodromes, such undercarriages being supported by the fuselage or hull and/or wing structure, and being retractable so as to enable the wheels to be raised clear of the water to permit the aircraft to operate thereon. Further, it has been proposed to provide aircraft of the seaplane kind, in which buoyant floats are utilised to support the aircraft fuselage clear of the water surface, with wheels retractively accommodated within the floats, enabling the aircraft to operate as an amphibian, both on land and water.

In accordance with the present invention an amphibian aircraft of the flying boat kind is provided with stabilising floats into which landing wheels are partly or wholly retractable, the wheels when extended projecting below the level of the hull so as to enable the aircraft to land and take off from a land aerodrome, and the float-supporting structure being capable of supporting the entire weight of the aircraft and being adapted to resist landing loads, when the aircraft is used as a land-plane. By the term "stabilising floats" is meant floats disposed at each side of the hull of a flying boat below the wing structure and supported partly or wholly thereby, and arranged by their buoyancy to maintain or assist in maintaining the transverse stability of the aircraft. Retraction may conveniently be effected by fluid pressure jack means arranged to cause swinging of a wheel mounting about a pivot bearing within a recess in the under surface of a stabilising float, and in order to enable landing wheels of comparatively small diameter to be used, whereby they can be accommodated within the float, the wheels may be arranged in tandem. The retraction of the wheel landing gear preferably effects simultaneous or subsequent closure of a door to the recess, and the door may form a water-tight closure, preventing immersion of the landing wheels and in effect increasing the buoyancy of the float.

The invention is illustrated diagrammatically in the accompanying drawings, showing its application to a flying boat of the high wing monoplane kind with the stabilising floats situated about one third of the way along the span. In the drawings—

Figure 1 is a front elevation of the flying boat showing the wheel undercarriage extended in dotted lines;

Figure 2 is a detail view in part section of a stabilising float showing the wheel landing gear accommodated therein in the retracted condition;

Figure 3 is a view similar to that of Figure 2 with the wheel undercarriage extended; and Figure 4 is a detail view of a valve arrangement suitable for effecting locking of the undercarriage in the retracted condition.

Referring to Figure 1, the flying boat has a buoyant hull 10 with a wing structure 11 supporting engines 12. The aircraft as shown is of the monoplane kind and below the wing on each side of the hull 10 a stabilising float 13 is mounted on shock-absorber struts 14. Each float 13 is further connected with the wing 10 by struts 15. The stabilising floats 13, whilst providing some buoyancy supporting the weight of the aircraft on the water, are primarily provided for the purpose of maintaining or assisting in maintaining the transverse stability of the flying boat, and for this purpose are generally placed sufficiently along the span of the wing to provide an adequate moment for maintaining the hull on an even keel in the transverse sense. The line W—L in Figure 1 shows the water line, with the aircraft supported by the buoyancy of the hull 10 and stabilising floats 13 on water, whilst the ground line G—L in Figure 1 shows the attitude of the aircraft when supported by the wheel landing gear generally shown at 16 in dotted lines. The wheel landing gear 16 is capable of being retracted so as to be accommodated within the floats 13, for the purpose of reducing air drag of the parts and also to enable the flying boat to land on and take off from water.

In Figures 2 and 3 there is shown in detail a stabilising float 13 having a recess 17, formed with an opening in its underside serving to accommodate retraction gear and the wheels and wheel mounting when retracted. Wheels 18 as seen in Figure 1 are supported in tandem on a mounting 19 which may comprise any known or convenient shock-absorbing means, if shock-absorbing, in addition to that provided by the struts 14, is desired. The mounting 19 is carried about a main pivot 20 in a bearing structure 21 adapted to transmit landing loads directly to the shock-absorber struts 14 by which the float 13 is carried on the wing 11. The journal 21A of the bearing structure 21 is in the form of an elongated slot permitting a certain degree of movement of the pivot in the vertical sense against resilient resistance afforded by a spring diagrammatically shown at 22 (see Figure 2). A slot 23 in the structure 21 is formed as a circular arc about the pivot axis when the spindle is in its lowermost position in the elongated journal bearing, and a transverse pin 24 carried on a prolongation of the mounting 19 beyond the pivot 20 engages this arcuate formation, which is conveniently duplicated so as to provide one on each side of the mounting. Under ground load with the wheels 18 extended, the spring 22 is compressed so that the pin 24 enters extensions 25 of the slots 23 in the vertical sense, whereby the mounting is effectively locked against angular movement. When the wheels 18 are relieved of ground load the spring 22 urges the pivot spindle downwardly to disengage the pin 24 from the slot extensions 25, whereafter the mounting is free to swing about the pivot 20, the pin 24 being guided in the arcuate slots 23.

The mechanism for effecting retraction comprises a pair of hydraulic double-acting piston and cylinder jacks 26 with an associated hydraulic lock 27 arranged in series. The jack cylinder is pivotally mounted at 28 on the bearing structure 21, whilst the outer extremity of the piston rod is pivoted to the transverse pin 24. Introduction of hydraulic pressure to the appropriate side of the piston causes angular movement of the mounting 19 about the pivot bearing 20 so as to extend and retract the wheels 18. The hydraulic pressure to each jack is supplied by pipelines 29 and 29A from a reversible source, and the locking device 27 is interposed in the pipe appropriate for extension of the undercarriage.

The locking device 27 shown in detail in Figure 4 comprises a cylinder 30 within which operates a hollow piston 31, integral with which is a locking pin 32. The lower end of the cylinder is closed by a wall 33 in screwed engagement with the cylinder 30, and providing a sleeve portion 34 the upper end 35 of which forms a stop limiting the downward movement of the piston 31. Within the sleeve portion 34 there operates a piston device 36 guided on a piston rod 37 within the wall 33, and resiliently urged by a spring 38 in the upward direction. The piston 36 thus forms a yieldable wall to the cylinder 30. A compression spring 39 interposed between the piston 36 and the piston 31 urges the locking bolt 32 in an upward direction, into a position where it locks the wheel mounting 19 in the retracted condition. For extension of the wheel mounting, liquid under pressure is introduced through the pipeline 29 to the port 40 at the upper end of the cylinder 30, and this acting on the piston 31 depresses the locking bolt 32 by compressing the spring 39 and displacing liquid from underneath the piston 31 through a port 41 which forms a branch of a conduit 42 leading by pipeline 43 (see Figures 2 and 3) to the jack 26. Pressure on top of the piston 31 depresses it until its upper edge 44 aligns with the port 45, which constitutes a second branch of the conduit 42. There is then free passage of liquid from the pressure source through the port 40, port 45 and conduit 42 to the jack 26, so as to operate the piston and cause the wheel mounting to swing from the position shown in Figure 2 to that of Figure 3. It will be appreciated that until the bolt 32 releases the piston 24 to allow it to slide in the arcuate slots 23 the piston of the jack 26 is not free to move, and further that the overlap of the piston 31 closes the port 41 during depression before the port 45 is open to the port 40; the yielding wall 36 accommodates for liquid trapped below the piston 31 during depression, especially after the port 41 is cut off. The upper edge 35 of the sleeve portion 34 forms a stop limiting the downward movement of the piston 31.

In order to retract the undercarriage, pressure fluid is supplied directly through the pipe 29A to the jack 26 and operates on one side of its piston, displacing liquid on its other side, and this liquid passes through the pipeline 43 to the conduit 42. The spring 39 having urged the bolt upwards after completion of undercarriage extension, leaves the port 41 open so that liquid from the jack 26 acting on the underside of the piston 31 raises the ball valve 46 accommodated within the hollow of the piston 31. This ball valve is spring-urged to the closed position by a compression spring 47. The liquid displaced by the piston of the jack 26 thus passes back through the conduit 42, port 41, through the hollow of the piston 31 to the port 40 and thence back to the reservoir of the pressure system by way of pipeline 29. At the completion of retraction the pin rides on a ramp formation 48 at the extremity of the bolt 32, whereafter the bolt is spring-urged into the locked condition.

In Figures 2 and 3 a hinged door is illustrated for closing the compartment 17. This closure indicated at 49 is hinged at 50 to the float 13 and connected through a pair of pivoted links 51 to the wheel mounting 19. It will be appreciated that during swinging of the wheel mounting 19 in the upward direction the door 49 is caused to move angularly about its hinge axis and eventually reaches the closed position shown in Figure 2. Initial retraction movement of the mounting 19 causes the door closure 49 to move forwardly, and this forward movement continues until the pivots 52 and 53 (by which the links 51 are connected respectively to the closure 49 and mounting 19) and the axis 20 of swinging of the mounting 19 during retraction are co-linear. Further retraction movement causes the mounting 19 to pass over the dead centre, and continued movement effects closing of the door 49. If desired the links 51 may be telescopically extensible against resilient resistance, so that final retraction movement actually applies a tension in the links, the door having come up against a stop, whereby an effective seal may be provided. There is preferably also a non-return valve in the bottom of the recess permitting water to flow out from the space in which the ports are retracted, but preventing in-flow; this valve would presumably be placed at the step of float 13 where suction during take-off from water would extract any water that might have entered chamber 17. It will be appreciated that since the links 51 swing relative to the mounting 19 across the axis of rotation of the wheels 18, it is necessary that these links lie outside the planes of the wheels. The pivot axis 53 is thus constituted by a cross bar element extending transversely and fixed to the mounting 19.

It is, of course, to be understood that the float-supporting structure 14, 15, etc., is constructed as a sufficient structure to withstand all normal landing loads and the weight of the aircraft. Thus the stabilising floats and their attachment to the aircraft can be looked upon as constituting the main undercarriage elements when the aircraft is in use as a landplane. It will be appreciated that there must be sufficient clearance afforded between the hull 10 and the groundline for the shock absorber and tyre deflection which may occur when the aircraft is groundborne.

What I claim is:

1. Means for locking a pivotally mounted retractable landing gear against pivotal movement while the landing gear is in projected position and the weight of the aircraft is taken thereby comprising, a landing element, a supporting element therefor, means for pivotally attaching the landing element to the supporting element, said means including a journal defining a generally vertical path for reciprocation and an axle reciprocal therein, and latching means including adjacent members fixed on said elements, said members being relatively movable in a reciprocating path controlled by said pivotal attaching means into latching engagement upon relative reciprocal movement of said elements in response to the assumption of the weight of the aircraft by said landing elements and out of latching engagement to permit relative pivotal movement of said elements as the aircraft is otherwise supported.

2. Means for locking a pivotally mounted retractable landing gear against pivotal movement while the landing gear is in projected position and the weight of the aircraft is taken thereby comprising, a landing element, a supporting element therefor, means for pivotally attaching the landing element to the supporting element, said means including a journal defining a generally vertical path for reciprocation and an axle reciprocal therein, latching means including adjacent members fixed on said elements, said members being relatively movable in a reciprocating path controlled by said pivotal attaching means into latching engagement upon relative reciprocal movement of said elements in response to the assumption of the weight of the aircraft by said landing elements and out of latching engagement to permit relative pivotal movement of said elements as the aircraft is otherwise supported, and a spring mounted in said journal in engagement with said axle for normally urging the axle toward the bottom of said journal.

3. A retractable landing gear for aircraft comprising, a support attached to the aircraft, a landing element pivoted to said support, a jack pivoted to said support and including an extensible arm pivotally attached to said landing element, means on said support defining a lock for said arm in extended position, means on said support operable upon said arm for locking the same in retracted position, means in said support defining a guideway for said arm to control its reciprocating path and to guide the same from one lock to the other, and means for operating said jack to extend said arm to move said landing element to and from a landing position.

4. An amphibious aircraft of the flying boat type having a buoyant landing member, mountings supported within said buoyant member, a retractable ground landing element pivotally attached to said mounting for movement to and from a position wholly within said buoyant member, a hydraulic jack having an extensible arm attached to said ground landing element, a lock operable upon said arm and associated with said jack to effect the locking of said arm in fixed position when the latter is retracted, closure means associated with said buoyant member and movable to permit the projection of said ground landing element, said closure means being attached to said ground landing element and adapted to be moved thereby upon full retraction thereof to a position to seal said buoyant member against leakage, whereby when said ground landing element is retracted, said closure means is rigidly locked in sealing position by the action of the lock on the arm attached to the landing element.

5. A retractable landing gear for aircraft comprising, a float, a supporting element therein including a slot and an oval journal, a ground landing element including a round axle operable within said journal and a stud adapted to cooperate with said slot in one position of said axle in said journal to lock said supporting element and said landing element against relative movement, means for projecting and retracting said ground landing element to and from a position within said float about said journal as an axis, a spring mounted in said journal and operable upon said axle for urging the same to a position within the journal where said stud and slot do not cooperate, said spring being compressed when the aircraft is supported on said landing element thereby locking the same in landing position, while an automatic release of said lock is effected by the action of said spring when the aircraft is otherwise supported.

THEODORE HANDLEY STONE.